（12) United States Patent
Abbasfar

(10) Patent No.: US 8,943,382 B2
(45) Date of Patent: Jan. 27, 2015

(54) CODE-ASSISTED ERROR-DETECTION TECHNIQUE

(71) Applicant: Rambus Inc., Sunnyvale, CA (US)

(72) Inventor: Aliazam Abbasfar, San Diego, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/850,008

(22) Filed: Mar. 25, 2013

(65) Prior Publication Data

US 2013/0275828 A1  Oct. 17, 2013

Related U.S. Application Data

(63) Continuation of application No. 12/858,923, filed as application No. PCT/US2009/034486 on Feb. 19, 2009, now Pat. No. 8,407,558.

(60) Provisional application No. 61/031,248, filed on Feb. 25, 2008.

(51) Int. Cl.
*H03M 13/00* (2006.01)
*G06F 11/07* (2006.01)
*G06F 11/10* (2006.01)

(52) U.S. Cl.
CPC ........ *G06F 11/0793* (2013.01); *G06F 11/1004* (2013.01)
USPC ...................................................... 714/755

(58) Field of Classification Search
None
See application file for complete search history.

(56) References Cited

U.S. PATENT DOCUMENTS

| 5,983,385 | A | 11/1999 | Khayrallah et al. | |
|---|---|---|---|---|
| 8,060,813 | B2 | 11/2011 | Yoon et al. | |
| 8,539,312 | B2 * | 9/2013 | Hargan | 714/766 |
| 2005/0289435 | A1 | 12/2005 | Mulla et al. | |
| 2006/0098320 | A1 | 5/2006 | Koga et al. | |
| 2007/0214403 | A1 | 9/2007 | Longwell et al. | |
| 2007/0271495 | A1 | 11/2007 | Shaeffer et al. | |
| 2008/0155378 | A1 * | 6/2008 | Amidi | 714/764 |
| 2008/0225603 | A1 * | 9/2008 | Hein | 365/189.05 |
| 2008/0288844 | A1 | 11/2008 | Nieuwland | |
| 2009/0019344 | A1 | 1/2009 | Yoon et al. | |

(Continued)

OTHER PUBLICATIONS

Notification of Transmittal of the International Search report and the Written Opinion of the International Searching Authority with mail date of Sep. 28, 2009 re PCT/US2009/034486 filed on Feb. 19, 2009. 12 pages.

(Continued)

*Primary Examiner* — Michael Maskulinski
(74) *Attorney, Agent, or Firm* — Lance Kreisman; Peninsula Patent Group

(57) ABSTRACT

A circuit, wherein an encoder circuit encodes a set of N symbols as a given codeword in a code space, where the given codeword includes a set of M symbols. M drivers are coupled to the encoder circuit and are coupled to M links in a channel, where a given driver outputs a given symbol in the set of M symbols onto a given link. An error-detection circuit coupled to the encoder circuit generates and stores error-detection information associated with the set of M symbols, facilitating subsequent probabilistic determination of a type of error during communication of the set of M symbols to another circuit. A receiver circuit receives feedback information from the other circuit, which includes error information about detection of another type of error in the set of M symbols based on characteristics of the code space. Control logic performs remedial action based on the feedback information.

22 Claims, 6 Drawing Sheets

(56) References Cited

U.S. PATENT DOCUMENTS

2009/0110109 A1    4/2009  Skerlj
2009/0193290 A1*   7/2009  Arimilli et al. .................. 714/7

OTHER PUBLICATIONS

Notification re Transmittal of International Preliminary Report on Patentability with mail date of Sep. 10, 2010 re PCT/US2009/034486 filed on Feb. 19, 2009, with one reference citation. 7 pages.

* cited by examiner

```
                                                    ┌─ 300
┌─────────────────────────────────────────────────────────┐
│  ENCODE A SET OF N SYMBOLS AS A GIVEN CODEWORD IN A     │
│  CODE SPACE IN A CIRCUIT, WHERE THE GIVEN CODEWORD      │
│  INCLUDES A SET OF M SYMBOLS                            │
│                         310                             │
└─────────────────────────────────────────────────────────┘
                              │
                              ▼
┌─────────────────────────────────────────────────────────┐
│  TRANSMIT THE SET OF M SYMBOLS TO ANOTHER CIRCUIT VIA   │
│  A CHANNEL THAT INCLUDES M LINKS, WHERE A GIVEN SYMBOL  │
│  IS TRANSMITTED ON A GIVEN LINK                         │
│                         312                             │
└─────────────────────────────────────────────────────────┘
                              │
                              ▼
┌─────────────────────────────────────────────────────────┐
│  GENERATE AND STORE ERROR-DETECTION INFORMATION         │
│  ASSOCIATED WITH THE SET OF M SYMBOLS, WHERE THE        │
│  ERROR-DETECTION INFORMATION FACILITATES SUBSEQUENT     │
│  PROBABILISTIC DETERMINATION OF A TYPE OF ERROR DURING  │
│  COMMUNICATION OF THE SET OF M SYMBOLS TO THE OTHER     │
│  CIRCUIT                                                │
│                         314                             │
└─────────────────────────────────────────────────────────┘
                              │
                              ▼
┌─────────────────────────────────────────────────────────┐
│  RECEIVE FEEDBACK INFORMATION FROM THE OTHER CIRCUIT,   │
│  WHERE THE FEEDBACK INFORMATION INCLUDES ERROR          │
│  INFORMATION ABOUT DETECTION OF ANOTHER TYPE OF ERROR   │
│  IN THE SET OF M SYMBOLS BASED ON CHARACTERISTICS OF    │
│  THE CODE SPACE                                         │
│                         316                             │
└─────────────────────────────────────────────────────────┘
                              │
                              ▼
┌─────────────────────────────────────────────────────────┐
│  PERFORM REMEDIAL ACTION BASED ON THE FEEDBACK          │
│  INFORMATION                                            │
│                         318                             │
└─────────────────────────────────────────────────────────┘
```

┌─────────────────────────────────────────────────────────────────┐
│ RECEIVE A SET OF $M$ SYMBOLS IN A CIRCUIT FROM ANOTHER CIRCUIT, WHERE │
│   THE SET OF $M$ SYMBOLS ARE RECEIVED VIA A CHANNEL THAT INCLUDES $M$ │
│     LINKS, AND WHERE A GIVEN SYMBOL IS TRANSMITTED ON A GIVEN LINK │
│                               330                               │
└─────────────────────────────────────────────────────────────────┘
                                  ↓
┌─────────────────────────────────────────────────────────────────┐
│   DECODE A GIVEN CODEWORD IN A CODE SPACE ASSOCIATED WITH THE SET │
│ OF $M$ SYMBOLS TO A SET OF $N$ SYMBOLS, AND PROVIDE ERROR INFORMATION │
│  ABOUT DETECTION OF THE OTHER TYPE OF ERROR IN THE SET OF $M$ SYMBOLS │
│              BASED ON CHARACTERISTICS OF THE CODE SPACE          │
│                               332                               │
└─────────────────────────────────────────────────────────────────┘
                                  ↓
┌─────────────────────────────────────────────────────────────────┐
│  GENERATE ERROR-DETECTION INFORMATION ASSOCIATED WITH THE SET OF │
│      $M$ SYMBOLS, WHERE THE ERROR-DETECTION INFORMATION FACILITATES │
│   SUBSEQUENT PROBABILISTIC DETERMINATION IN THE OTHER CIRCUIT OF THE │
│  TYPE OF ERROR DURING COMMUNICATION OF THE SET OF $M$ SYMBOLS TO THE │
│                             CIRCUIT                              │
│                               334                               │
└─────────────────────────────────────────────────────────────────┘
                                  ↓
┌─────────────────────────────────────────────────────────────────┐
│    TRANSMIT FEEDBACK INFORMATION TO THE OTHER CIRCUIT, THEREBY   │
│         FACILITATING REMEDIAL ACTION BY THE OTHER CIRCUIT        │
│                               336                               │
└─────────────────────────────────────────────────────────────────┘

FIG. 3B

CODE-ASSISTED ERROR-DETECTION TECHNIQUE

RELATED APPLICATION

The present application is a continuation of U.S. Ser. No. 12/858,923, filed Aug. 18, 2010, entitled "Code-Assisted Error-Detection Technique", by inventor Aliazam Abbasfar, issuing as U.S. Pat. No. 8,407,558 on Mar. 26, 2013, which claims priority under 35 U.S.C §120 to International Application No. PCT/US2009/034486, entitled "Code-Assisted Error-Detection Technique," filed on February 19, 2009, which further claims priority under 35 U.S.C. §119 to U.S. Provisional Patent Application No. 61/031,248, filed Feb. 25, 2008, each of which is incorporated herein by reference in its entirety.

TECHNICAL FIELD

The present embodiments relate to techniques for detecting errors during communication of information. More specifically, the present embodiments relate to circuits and methods for detecting errors based on coding constraints associated with an encoding technique.

BRIEF DESCRIPTION OF THE FIGURES

FIG. 3A is a flowchart illustrating an embodiment of a process for communicating data.

FIG. 3B is a flowchart illustrating an embodiment of a process for communicating data.

Figure 1:
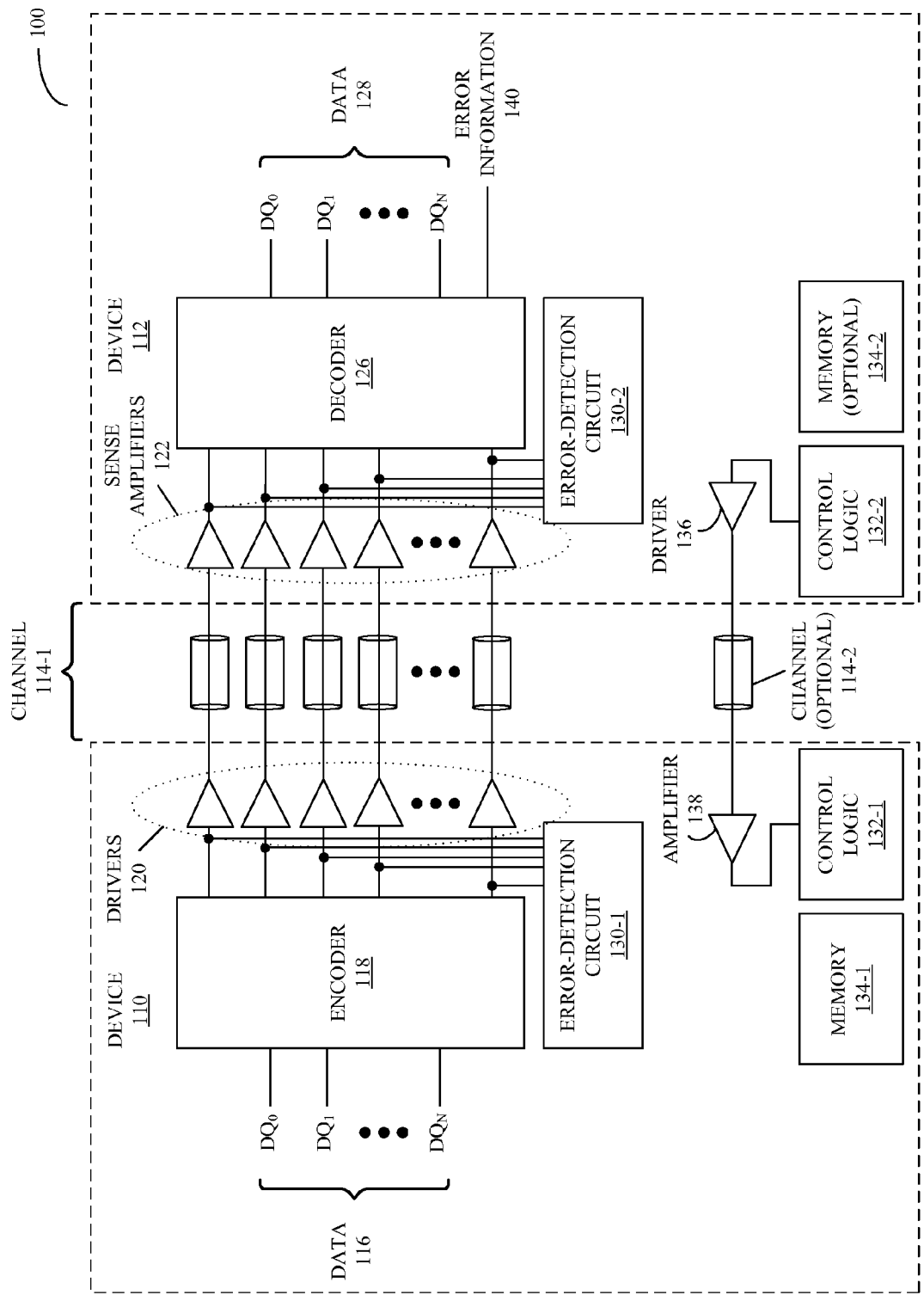
FIG. 1 is a block diagram illustrating an embodiment of a system.

Table 1 provides Dynamic-Bus-Inversion (DBI) encoded data.

Note that like reference numerals refer to corresponding parts throughout the drawings.

DETAILED DESCRIPTION

Embodiments of one or more circuits, an integrated circuit that includes at least one of the one or more circuits, a memory device that includes at least one of the one or more circuits, a system that includes a transmitter (such as on a memory controller) and a receiver (such as on the memory device), and a technique for communicating data are described. This technique facilitates communication between devices or integrated circuits. In particular, the technique uses constraints associated with a code space to identify a first type of error, such as a burst error that affects more than two bits or symbols that are communicated between circuits. For example, when an encoded set of bits or symbols are received and decoded, the presence of an invalid codeword may indicate that an error has occurred during communication. Moreover, error-detection and/or correction codes may be used in conjunction with the coding constraint(s) to determine if it is likely or probable that a second type of error, such as an error affecting two or fewer bits in the set of bits or symbols, has occurred. By combining the coding constraint with error-detection and/or correction codes, this communication technique may facilitate communication of data with an increased probability of errors being detected, and thus, may facilitate remedial action that improves communication performance.

FIG. 1 presents a block diagram illustrating an embodiment of a system 100, in which an encoder 118 in device 110 (such as a memory controller) encodes N data symbols $DQ_i$ in data 116 as a corresponding codeword in a code space having M symbols using an encoding technique, such as Dynamic-Bus-Inversion (DBI) (which is sometimes referred to as Data-Bus-Inversion).

In some embodiments, the M symbols have binary values, including a first value (such as a logical '0') and a second value (such as a logical '1'). Moreover, in some embodiments the code implemented in the encoding technique selectively inverts the set of M symbols if there are more than a predetermined number of symbols in the M symbols that have a first value. For example, if N=8 and there are more than four symbols that have the second value in the M symbols, symbols that have the first value may be converted into symbols that have the second value, and symbols that have the second value may be converted into symbols that have the first value. In this way, the number of symbols that have the second value in the M symbols may be four or fewer, which may reduce simultaneous switching noise. In other embodiments the DBI coding constraint may be that the number of symbols that have the first value in the M symbols is four or fewer.

After encoding, error-detection circuit 130-1 may generate error-detection information (such as a cyclic-redundancy-check code or CRC code) associated with a block of symbols over multiple clock cycles that includes the set of M symbols. This error-detection information may facilitate subsequent probabilistic determination of the second type of error during communication of the block of symbols to another circuit, such as device 112 (which may be a memory device). For example, the second type of error may include bit or symbol errors in two or fewer symbols in the block of symbols. In particular, the error-detection information may be stored in memory 134-1, and as described further below, this error-detection information may be subsequently compared to additional error-detection information associated with the block of symbols that is received by device 112.

Next, drivers 120 output the M symbols associated with the codeword onto M wires or links in channel 114-1. For example, during a given time interval (such as a symbol time) a given symbol in the M symbols may be output on a given link.

At device 112, sense amplifiers 122 receive the M symbols on the M links. Sense amplifiers 122 may be single-ended or differential circuits, such as difference-generating circuits which may each compare received symbols associated with a given pair of links (which is sometimes referred to as 'pseudo-differential detection'). In some embodiments, sense amplifiers 122 compare received symbols associated with all pairings of the M links. For example, there may be M(M−1)/2 sense amplifiers 122. However, in other embodiments the sense amplifiers 122 compare received symbols associated with a subset of the pairings of the M links. For example, there may be M(M/2−1)/2 sense amplifiers 122.

Based on the outputs from the sense amplifiers 122 (which identify a particular codeword), decoder 126 decodes the received M symbols to a corresponding set of N data symbols $DQ_i$, i.e., to data 128. If the M received symbols correspond to an invalid codeword in the code space (e.g., the M received symbols violate one or more constraints in a code space), an error has occurred during communication. This error may include the first type of error. In particular, this first type of error may include bit or symbol errors in more that two symbols in the M symbols (which is sometimes referred to as a burst error). When this occurs, decoder 126 may provide error information 140 that indicates that such an error has been detected.

Moreover, error-detection circuit 130-2 may generate the additional error-detection information associated with the block of symbols, which includes the received set of M symbols. This additional error-detection information may facilitate subsequent probabilistic determination of the second type of error in device 110. In particular, control logic 132-2 may communicate the additional error-detection information to device 110 using: driver 136, optional channel 114-2, and amplifier 138. Alternatively, the additional error-detection information may be communicated using channel 114-1, or via some other backchannel. Prior to being communicated to device 110, the additional error-detection information may be temporarily stored in optional memory 134-2.

Once the additional error-detection information is received by device 110, control logic 132-1 may compare the error-detection information generated before the block of symbols was transmitted with the additional error-detection information generated after the block of symbols was received. If it is probable that the second type of error has occurred, control logic 132-1 may perform remedial action. For example, at least a portion of the block of symbols, such as the M symbols (which may have been stored in memory 134-1), may be retransmitted to device 112.

Control logic 132-2 may also communicate error information 140 to device 110 (and, more generally, feedback information that includes information about errors that have been detected in the received M symbols). This communication may be via channel 114-1 and/or optional channel 114-2. In some embodiments, the additional error-detection information, the error information 140, or both are communicated to device 110. For example, the additional error-detection information may be communicated for a given block of symbols unless the error information 140 indicates that the first type of error has been detected in one or more sets of M symbols in the given block of symbols, in which case the error information 140 may be communicated. In some embodiments, a flag, such as a symbol or bit, is asserted to indicate whether the additional error-detection information or the error information 140 is being communicated to device 110. Alternatively, whether or not the first type of error has been detected, the additional error-detection information and the error information 140 may be communicated for the given block of symbols. If the error information 140 indicates that the first type of error has occurred, control logic 132-1 may also perform remedial action.

In some embodiments the control logic 132 and/or error-detection circuits 130 use additional techniques to recover or prevent the loss of data communicated between components in the memory system 100 and/or the loss of stored data. For example, in addition to or separate from error-detection-code (EDC) information, at least a portion of the data communicated between the components and/or the stored data may include error-correction-code (ECC) information. This EDC and/or ECC information may be pre-existing or may be dynamically generated (e.g., in real time).

In some embodiments, the ECC information includes a Bose-Chaudhuri-Hocquenghem (BCH) code. BCH codes are a sub-class of cyclic codes. In exemplary embodiments, the ECC information includes: a CRC code, a parity code, a Hamming code, a Reed-Solomon code, and/or another error checking and correction code.

Consequently, in some embodiments receiver circuits implement error detection and/or correction. For example, errors associated with communication may be detected by performing a multi-bit XOR operation in conjunction with one or more parity bits in the signals.

In some embodiments, the coding constraint is checked by decoder 126 for each set of M symbols that are received. Table 1 provides an example of DBI encoded data. In this example, the DBI coding constraint is that the number of '1's in a given set of nine symbols is fewer than five. Based on this constraint, sets of symbols 2 and 4 include errors, such as the first type of error.

TABLE 1

| Set 1 | Set 2 | Set 3 | Set 4 | Set 5 | Set 6 | Set 7 | Set 8 |
|-------|-------|-------|-------|-------|-------|-------|-------|
| 1 | 0 | 0 | 0 | 0 | 0 | 0 | 0 |
| 0 | 1 | 0 | 1 | 0 | 0 | 1 | 0 |
| 0 | 0 | 0 | 1 | 1 | 0 | 0 | 1 |
| 0 | 1 | 1 | 0 | 1 | 0 | 0 | 0 |
| 1 | 1 | 0 | 1 | 0 | 1 | 0 | 1 |
| 0 | 0 | 1 | 0 | 0 | 0 | 1 | 0 |
| 0 | 1 | 1 | 1 | 1 | 0 | 1 | 1 |
| 1 | 0 | 1 | 0 | 0 | 0 | 0 | 0 |
| 0 | 1 | 0 | 1 | 0 | 1 | 1 | 0 |

Figure 2:
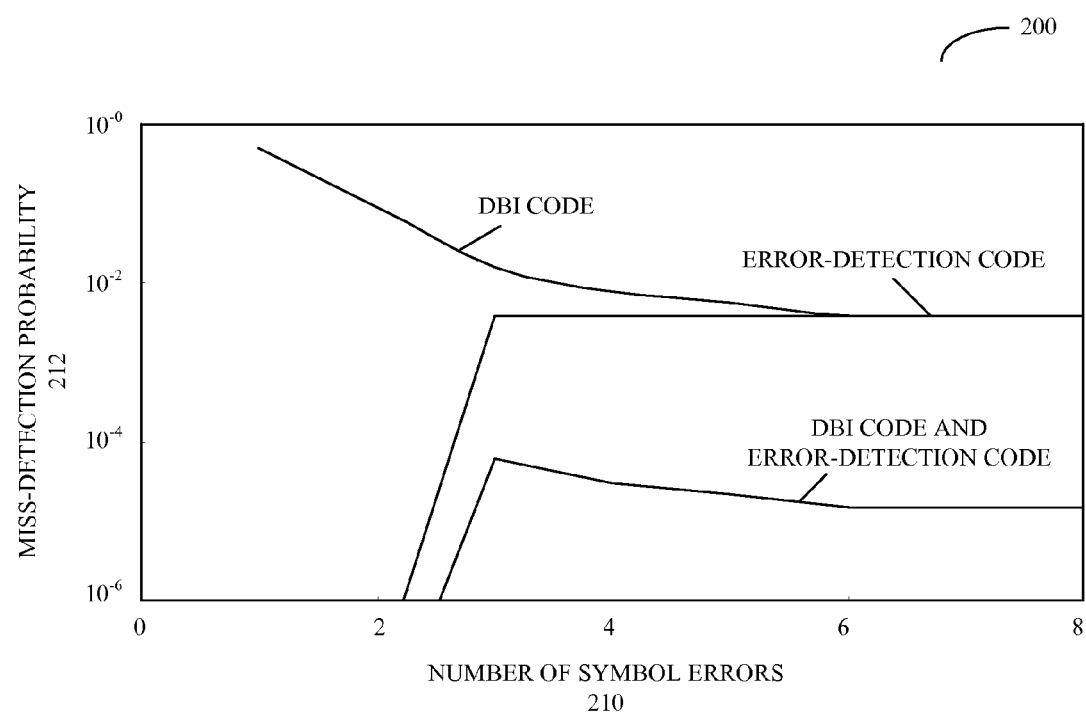
FIG. 2 is a graph illustrating miss-detection probability as a function of a number of symbol errors.

By combining error-detection coding with information associated with an encoding technique (such as coding constraints associated with a code space), error-detection may be improved (e.g., the probability of not detecting an error, or miss-detection, may decrease). In particular, the probability of detecting the first type of error (e.g., burst errors) may be increased. This is shown in FIG. 2, which presents a graph 200 illustrating miss-detection probability 212 as a function of a number of symbol errors 210.

In this example, the error-detection code is a CRC code that can detect errors when there are fewer than 3 bits or symbols in error. Additionally, the error information determined from the DBI coding constraints may have a high miss-detection probability 212 for a small number of symbol errors 210. However, the combination of the CRC code with the error information determined from the DBI coding constraints offers a lower miss-detection probability 212 over the entire range of the number of symbol errors 210.

In particular, the combined probability of CRC-code miss-detection and DBI compliance of the set of M symbols equals the probability of CRC-code miss-detection times the probability that the set of M symbols is DBI compliant. This second term can be used to reduce the miss-detection probability 212. For example, over eight clock cycles sets of symbols 1-8 in Table 1 may define a 72-symbol data packet. This data packet may be used to generate 8-bit CRC codes before and after transmission of the data packet. In this example, the probability that the set of M symbols is DBI compliant is approximately 0.004. As shown in graph 200, this results in a reduction in the probability of miss-detecting errors with more than two symbols by two orders of magnitude to $3 \times 10^{-5}$.

Embodiments of one or more of these circuits, integrated circuits, systems and/or techniques may be used during inter-chip and/or intra-chip communication. For example, these techniques may be used in memory systems and/or memory devices that include different types of memory, such as: volatile memory, non-volatile memory, dynamic random access memory (DRAM), static random access memory (SRAM), read-only memory (ROM), erasable programmable read-only memory (EPROM), electrically erasable programmable read-only memory (EEPROM), flash, solid-state memory, and/or another type of memory. Moreover, for a given type of memory, these techniques may be used in different memory technologies or technology generations (which may use different power supply voltages). For example, these techniques may be used in: extreme data rate (XDR), dual-data rate (DDR), graphics dual-data rate (GDDR) and/or synchronous DRAM, such as: DDR2, DDR3, DDRx, GDDR1, GDDR3, GDDR5, and/or mobile DDR.

Consequently, components (such as a memory controller, a memory device, a memory module, and/or a memory system) that use these techniques may be included in a wide variety of applications, such as: desktop or laptop computers, computer systems, hand-held or portable devices (such as personal digital assistants and/or cellular telephones), set-top boxes, home networks, and/or video-game devices. For example, a storage device (such as the memory module) may be included in computer main memory. Moreover, one or more of these embodiments may be included in a communication channel, such as: serial or parallel links, metropolitan area networks, local area networks (LANs), and/or personal area networks (PANs).

We now further describe embodiments of circuits, devices and systems to communicate data. Error-detection codes, such as a CRC code, can be used to detect errors during communication. However, because of the additional overhead associated with such error-detection codes, they are often used to detect the second type of error in which a small number symbols are in error (e.g., one or two symbols in a set of symbols). Unfortunately, such as during communication on parallel links, the first type of error can occur, during which multiple symbols in a set of symbols are in error. In the discussion that follows, coding constraints associated with an encoding technique (such as a modulation code) are used separately or in conjunction with an error-detection code to determine if either type of error has occurred.

In the discussion that follows, single-ended communication or signaling may be defined as a technique for transmitting information by varying an electrical signal (such as a voltage or a current) over one wire or link for comparison with a reference conveyed over another wire or link. In general, multiple single-ended signals can share a reference, such as a voltage reference. Moreover, differential communication or signaling may be defined as a technique for transmitting information by varying complementary electrical signals conveyed on given wires or links.

Multiple-wire or multi-wire communication or signaling can include as a technique for transmitting symbols over a set of at least three wires or links by encoding each symbol into at least three electrical signals (for example, using a 1-3 encoding technique) for transmission over a given group of links. At a receiver, each symbol conveyed using multi-wire signaling may be decoded using at least the three signals on the given group of links. In some embodiments, balanced multi-wire signaling is used, in which the sum of the values of the electrical signals is constant over multiple symbols times. Moreover, in some embodiments multi-wire differential signaling is used, in which the codewords can be detected by looking at the voltage difference between all pairs of links.

However, multi-wire signaling can also be used to communicate binary symbols in parallel over a pair of links during one time interval, and another pair of links (which may be different than the pair of links) is used to communicate binary symbols during a subsequent time interval. Consequently, a general definition of multi-wire signaling is spatially and/or temporally encoded differential signaling (which is sometimes referred to as 'pseudo-differential signaling'), thereby encompassing embodiments in which symbols are physically distributed over different wires (for example, the spatial distribution may happen over time, from one time interval to the next, or from one symbol to the next).

We now describe FIG. 1 in more detail. In system 100, device 110 communicates information with device 112 via the channel 114-1 (for example, during a write operation from a memory controller). During this communication, device 110 receives data 116 (from an on-chip or off-chip data source), including N data symbols $DQ_i$, at a given clock edge or during a given time interval (if there is a slight variation in the arrival time of the N data symbols). These data symbols are encoded using an encoding technique (in which the code space may encode symbols associated with a given codeword on multiple wires or links) by encoder 118, which outputs M symbols corresponding to the N data symbols. Next, the error-detection information is generated by error-detection circuit 130-1 and stored in memory 134-1. Then, the M symbols are transmitted by drivers 120 as analog or digital signals onto M wires or links in channel 114-1. These drivers may have different gain values or weighting $W_i$. Moreover, drivers 120 may include single-ended drivers.

During the encoding, the N data symbols in an input space are mapped to a corresponding set of M symbols or a codeword in an output space. In some embodiments, N is a positive number and M is a larger positive integer. For example, N may be 8 and M may be 9 (i.e., the encoding technique may use an 8-9 code). As noted previously, in some embodiments the encoding may include a DBI code.

In general, a wide variety of encoding techniques may be implemented by encoder 118, including: a 1-3 code, a 1.5-3 code, 4-6 code, a 5-7 code, a 6-8 code, a 7-9 code a 7-10 code, an 8-10 code, an 8-9 code, an 8-11 code, and/or a 2-12 code (for example, two instances of a 4-6 code). In some embodiments, N is less than M, and M is less than 2N. Moreover, in some embodiments multi-wire encoding is used (i.e., the data is communicated using multi-wire communication or signaling). Additionally, in some embodiments cascaded or composite encoding techniques are used, which combine two or more of these encoding techniques.

At device 112, sense amplifiers 122 receive and sample the M symbols on the M links at a given clock edge or during the given time interval (if there is a slight variation in the arrival time of the M symbols). In some embodiments, a given sense amplifier, such as a difference-generating circuit, is coupled to a given pair of links and may compare the received symbols associated with this given pair. In an exemplary embodiment, the links are single-ended and/or the sense amplifiers 122 are differential amplifiers or differential comparators.

However, in some embodiments the sense amplifiers 122 include single-ended amplifiers. In these embodiments, a given input node is coupled to a given sense amplifier in the sense amplifiers 122. Moreover, one or more reference voltages that track noise signals during communication between devices 110 and 112 may be obtained by partially terminating the M links to a common node of sense amplifiers 122. Consequently, the one or more reference voltages may be generated on-chip or may be an external reference voltage (e.g., a reference voltage may be generated off-chip).

Outputs from the sense amplifiers 122 are coupled to decoder 126, which decodes the received M symbols to a corresponding set of N data symbols $DQ_i$, i.e., to data 128 (which may be stored or further processed either on-chip or off-chip). In particular, as discussed previously, the decoding is based on the outputs from the sense amplifiers 122, which identify a particular set of M symbols or a particular codeword. Moreover, if an error is detected during the decoding (such as when the M symbols correspond to an invalid codeword or violate one of the coding constraints), the error information 140 may indicate that an error (such as the first type of error) has been detected in the M symbols.

Additionally, error-detection circuit 130-2 may generate the additional error-detection information based on the block of received symbols. For example, consecutive sets of M symbols (which define the block of symbols), including the M symbols, may be received by device 112 over multiple clock cycles (e.g., over multiple symbol times), and these sets of M symbols may be used to generate the additional error-detection information.

This additional error-detection information may be communicated to device 110, where it may be compared to the stored error-detection information, thereby allowing control logic 132-1 to probabilistically determine errors, such as the second type of error, in at least a portion of the block of symbols. For example, device 112 may communicate feedback information, such as the additional error-detection information, via channel 114-1 and/or optional channel 114-2.

In some embodiments, the feedback information includes the error information 140 and/or the additional error-detection information. For example, either the error information 140 associated with one or more sets of M symbols or the additional error-detection information associated with the block of symbols may be communicated. In some embodiments, the default may be for the additional error-detection information to be communicated. However, if the first type of error has been detected in one or more sets of M symbols in the block of symbols (as indicated by the error information 140), then the error information 140 may be communicated to device 110. Alternatively, both the error information 140 for each set of M symbols and the additional error-detection information for each block of symbols may be communicated to device 110.

In an exemplary embodiment, the block of symbols includes a data packet having 72 symbols. For the block of symbols, the feedback information may include a 7-bit CRC code and a one-bit flag to communicate the type of error information 140. This feedback information may be communicated sequentially during 8 clock cycles. In some embodiments, the feedback information includes an 8-bit CRC code and the one-bit flag. In this case, the feedback information may be communicated sequentially during 9 clock cycles. This feedback information may have a run-length limit that facilitates recovery of a clock signal from the feedback information.

When the error information 140 and/or the comparison of the error-detection information and the additional error-detection information indicate that an error has occurred in at least a portion of the block of symbols (such as in the set of M symbols), remedial action may be performed based on instructions from control logic 132-1. As noted previously, some or all of the block of symbols (which may have been stored temporarily in memory 134-1) may be retransmitted to device 112. For example, the set of M symbols may be retransmitted. As described further below with reference to FIG. 4, in some embodiments control logic 132-2 performs remedial action when the error information 140 indicates that the first type of error has been detected in the M symbols.

While the preceding discussion has illustrated the communication of data from device 110 to device 112, in other embodiments device 112 communicates additional data to device 112 (for example, during a read operation). In these embodiments, the technique for communicating data may be used to detect the first type of error and/or the second type of error. If an error is detected, either or both of control logic 132, such as control logic 132-2, may perform remedial action. In some embodiments, the encoding technique used during communication of data from device 112 to device 110 is different that the encoding technique used during communication of data from device 110 to device 112. Consequently, asymmetric or different coding may be used when communicating in different directions in system 100.

At least some aspects of the various embodiments may be combined with each other. Moreover, components and/or functionality illustrated in system 100 may be implemented using analog circuits and/or digital circuits. Furthermore, circuits may be implemented using NMOS and/or PMOS transistors.

Additionally, components and/or functionality in these embodiments may be implemented using hardware and/or software. For example, encoder 118 and/or decoder 126 may be included in control logic, such as a processor or a processor core. Moreover, the encoding and the decoding may be at least partially implemented using a look-up table and/or a state machine.

These embodiments may include fewer components or additional components. For example, there may be additional instances of transmit circuits and/or receiver circuits in system 100. Moreover, in some embodiments additional techniques may be used to reduce the total capacitance associated with the receiver circuits, including: buffer circuits; equalizers (such as a linear equalizer or a Decision Feedback Equalizer); disaggregated amplifiers (in which, for example, a first trans-conductance stage in a differential amplifier is proximate to input pads and a second trans-impedance stage in the differential amplifier is remotely located from the input pads); and/or generating circuits that generate difference signals based on a smaller number of difference signals provided by sense amplifiers 122.

Additionally, in some embodiments skew compensation is used to reduce or eliminate differences or skew in the arrival times of two or more symbols on different links. Moreover, the transmit phase and/or the receive phase may be adjusted at either or both of devices 110 and 112 to compensate for skew. However, in many systems it may be too expensive to perform such adjustments at both ends of the channel. Consequently, in some embodiments the transmit phase at device 110 may be adjusted to compensate for skew when transmitting data (for example, during a write operation) and/or the receive phase at device 110 may be adjusted to compensate for skew when receiving data (for example, during a read operation).

In some embodiments, the transmitting and receiving of signals may be gated based on one or more timing signals that are provided by a frequency synthesizer. Consequently, signals may be transmitted and/or received based on either or both edges (e.g., these circuits may use dual data rate) in the one or more timing signals. Moreover, in some embodiments, transmitting and receiving may be synchronous and/or asynchronous.

These timing signals may be generated based on one or more clock signals, which may be generated: on-chip (for example, using a phase-locked loop and one or more timing reference signals provided by a frequency reference), off-chip, and/or recovered from received signals. Moreover, voltage levels and/or a voltage swing of the signals that are transmitted may be based on voltages provided by a power supply, and logic levels of the data that is received may be based on voltages provided by the power supply. These voltages may be fixed or adjustable.

In embodiments where system 100 is included in memory systems, a transmitter and receiver (or an instance of a transmit circuit and a receiver circuit) may be coupled to a separate command link (or communication channel), which communicates commands.

Additionally, two or more components in system 100 can be combined into a single component and/or the position of one or more components can be changed.

We now describe embodiments of a process for communicating data. FIG. 3A presents a flowchart illustrating a process 300 for communicating data, which may be performed by a device (such as a memory controller and/or a memory device). During operation, the device encodes a set of N symbols as a given codeword in a code space in a circuit (310), where the given codeword includes a set of M symbols. Next, the device transmits the set of M symbols to another circuit via a channel that includes M links (312), where a given symbol is transmitted on a given link. Then, the device generates and stores error-detection information associated with the set of M symbols (314), where the error-detection information facilitates subsequent probabilistic determination of a type of error (such as the second type of error) during communication of the set of M symbols to the other circuit.

Moreover, the device receives feedback information from the other circuit (316), where the feedback information includes error information about detection of another type of error (such as the first type of error) in the set of M symbols based on characteristics of the code space. Additionally, the device performs remedial action based on the feedback information (318).

FIG. 3B presents a flowchart illustrating a process 320 for communicating data, which may be performed by a device (such as a memory controller and/or a memory device). During operation, the device receives a set of M symbols in a circuit from another circuit (330), where the set of M symbols are received via a channel that includes M links, and where a given symbol is transmitted on a given link. Next, the device decodes a given codeword in a code space associated with the set of M symbols to a set of N symbols, and provides error information about detection of the other type of error (such as the first type of error) in the set of M symbols based on characteristics of the code space (332).

Additionally, the device generates error-detection information associated with the set of M symbols (334), where the error-detection information facilitates subsequent probabilistic determination in the other circuit of the type of error (such as the second type of error) during communication of the set of M symbols to the circuit. Furthermore, the device transmits feedback information to the other circuit, thereby facilitating remedial action by the other circuit (336).

In some embodiments of the processes 300 (FIG. 3A) and 320 there may be fewer or additional operations. Moreover, two or more operations can be combined into a single operation, and/or a position of one or more operations may be changed.

Figure 4:
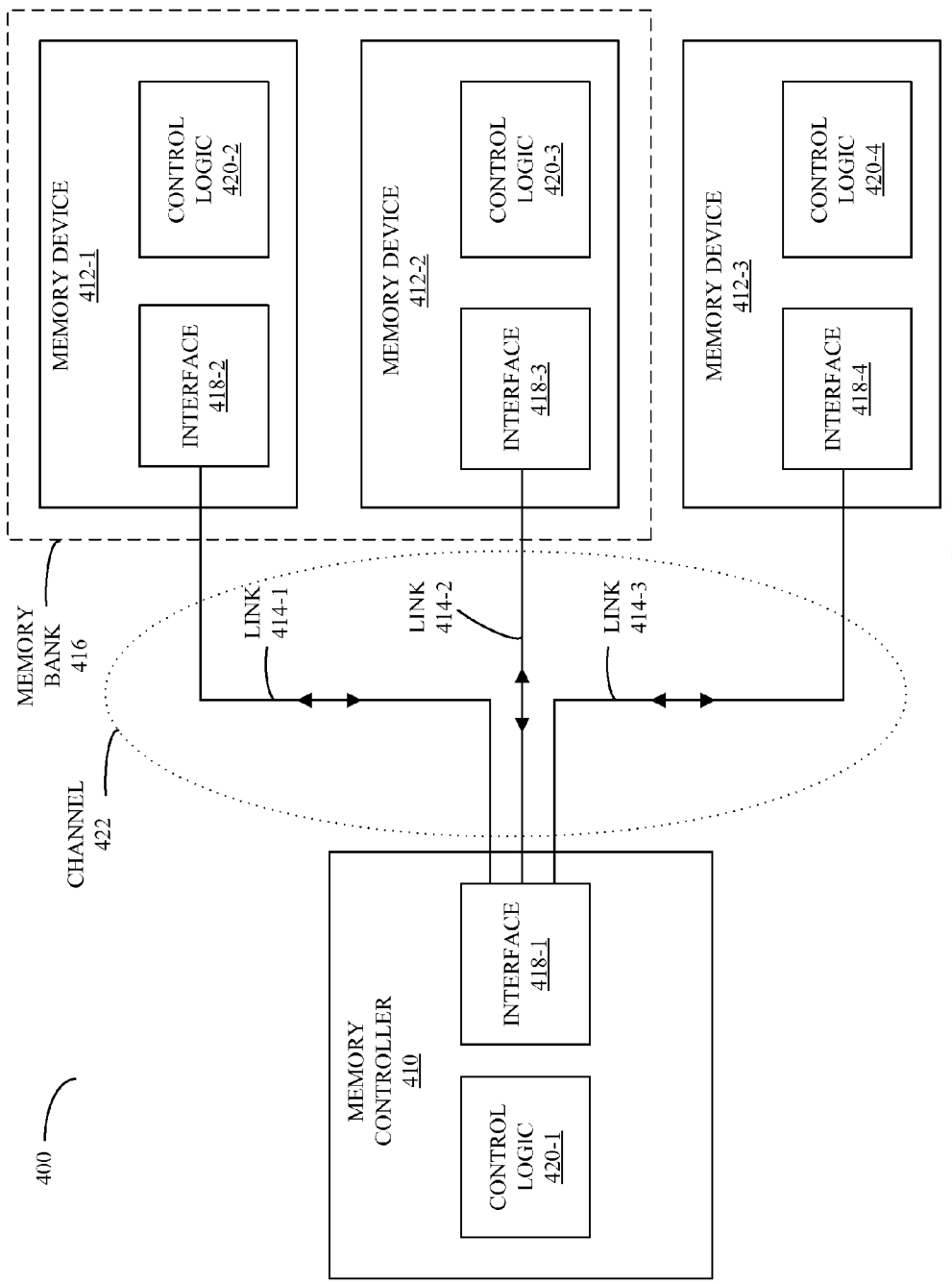
FIG. 4 is a block diagram illustrating an embodiment of a memory system.

We now further describe systems that may utilize one or more embodiments of the technique for communicating data. FIG. 4 is a block diagram illustrating an embodiment of a memory system 400. This memory system includes at least one memory controller 410 and one or more memory devices 412, such as one or more memory modules. While FIG. 4 illustrates memory system 400 having one memory controller 410 and three memory devices 412, other embodiments may have additional memory controllers and fewer or more memory devices 412. Moreover, while memory system 400 illustrates memory controller 410 coupled to multiple memory devices 412, in other embodiments two or more memory controllers may be coupled to one another. Memory controller 410 and one or more of the memory devices 412 may be implemented on the same or different integrated circuits, and that these one or more integrated circuits may be included in a chip-package.

In some embodiments, the memory controller 410 is a local memory controller (such as a DRAM memory controller) and/or is a system memory controller (which may be implemented in a microprocessor).

Memory controller 410 may include an I/O interface 418-1 and control logic 420-1. As discussed previously with reference to FIG. 1, control logic 420-1 may be used to encode data for transmission by the interface 418-1 to one or more of the memory devices 412 and/or to decode data received by the interface 418-1 from one or more of the memory devices 412 (for example, using a modulation code).

In some embodiments, one or more of memory devices 412 include control logic 420 and at least one of interfaces 418. However, in some embodiments some of the memory devices 412 may not have control logic 420. Moreover, memory controller 410 and/or one or more of memory devices 412 may include more than one of the interfaces 418, and these interfaces may share one or more control logic 420 circuits. In some embodiments two or more of the memory devices 412, such as memory devices 412-1 and 412-2, may be configured as a memory bank 416.

Memory controller 410 and memory devices 412 are coupled by one or more links 414 in a channel 422. While memory system 400 illustrates three links 414, other embodiments may have fewer or more links 414. These links may include: wired, wireless and/or optical communication. Moreover, links 414 may be used for bi-directional and/or uni-directional communications between the memory controller 410 and one or more of the memory devices 412. For example, bi-directional communication between the memory controller 410 and a given memory device may be simultaneous (full-duplex communication). Alternatively, the memory controller 410 may transmit information (such as a data packet which includes a command) to the given memory device, and the given memory device may subsequently provide requested data to the memory controller 410, e.g., a communication direction on one or more of the links 414 may alternate (half-duplex communication). In some embodiments, one or more of the links 414 and corresponding transmit circuits and/or receiver circuits are dynamically configured, for example, by one of the control logic 420 circuits, for bi-directional and/or unidirectional communication.

Signals corresponding to data and/or commands (such as request-for-data commands) may be communicated on one or more of the links 414 using either or both edges in one or more timing signals. These timing signals may be generated based on one or more clock signals, which may be: generated on-chip (for example, using a phase-locked loop and one or more timing reference signals provided by a frequency reference), off-chip, and/or recovered from the communicated signals. In some embodiments, transmitting and receiving these signals may be synchronous and/or asynchronous.

Modulation coding may include bit-to-symbol coding in which one or more data bits are mapped together to a data symbol, and symbol-to-bit coding in which one or more symbols are mapped to data bits. This modulation coding may include time-multiplexing, frequency multiplexing, and/or encoding. Thus, in some embodiments signals are encoded using: time-division multiple access, frequency-division multiple access, and/or code-division multiple access. Moreover, in some embodiments signals are communicated on the links 114 using discrete multi-tone communication (such as Orthogonal Frequency-Division Multiplexing).

Moreover, the modulation coding may include spread-spectrum encoding, for example, coding based on: binary pseudorandom sequences (such as maximal length sequences or m-sequences), Gold codes, and/or Kasami sequences. In general, the modulation coding may include: amplitude modulation, phase modulation, and/or frequency modulation, such as pulse-amplitude modulation (PAM), pulse-width modulation, and/or pulse-code modulation. For example, the modulation coding may include: two-level pulse-amplitude modulation (2-PAM), three-level pulse-amplitude modulation (3-PAM), four-level pulse-amplitude modulation (4-PAM), eight-level pulse-amplitude modulation (8-PAM), sixteen-level pulse-amplitude modulation (16-PAM), two-level on-off keying (2-OOK), four-level on-off keying (4-OOK), eight-level on-off keying (8-OOK), and/or sixteen-level on-off keying (16-OOK).

In some embodiments, a group of two data bits is mapped to: one of four different amplitudes of an encoded data signal; one of four different phases of a sinusoid; or a combination of one of two different amplitudes of a sinusoid and one of two different phases of the same sinusoid (such as in quadrature amplitude modulation or QAM). Moreover, in some embodiments the modulation coding includes three-or-more-level QAM. Additionally, the modulation coding may include non-return-to-zero (NRZ) coding. Furthermore, the different sub-channels communicated on the links 114 may be encoded differently.

In some embodiments, modulation coding is dynamically adjusted, for example, based on a performance metric associated with communication on one or more of the links 414. This performance metric may include: a signal strength (such as a signal amplitude or a signal intensity), a mean square error (MSE) relative to a target (such as a detection threshold, a point in a constellation diagram, and/or a sequence of points in a constellation diagram), a signal-to-noise ratio (SNR), a bit-error rate (BER), a timing margin, and/or a voltage margin.

In some embodiments, commands are communicated from the memory controller 410 to one or more of the memory devices 412 using a separate command link, e.g., using a subset of the links 414, which communicate commands. This separate command link may be: wireless, optical and/or wired. However, in some embodiments commands are communicated using the same portion of the channel 422 (i.e., the same links 414) as data. Moreover, communication of commands: may have a lower data rate than the data rates associated with communication of data between the memory controller 410 and one or more of the memory devices 412; may use different carrier frequencies than are used to communicate data; and/or may use a different modulation technique than is used to communicate data.

In some embodiments, the data communicated between the components (such as memory controller 410 and memory device 412-1) and/or the stored data may include EDC and/or ECC information.

Moreover, as discussed previously in FIG. 1, control logic 420 in the memory controller 410 and/or one or more of the memory device 412 may take a variety of remedial actions in the event of an error or a degradation of one or more of the performance metrics during communication between the memory controller 410 and one or more of the memory devices 412. These remedial actions may include: re-transmitting previous data; transmitting previous or new data (henceforth referred to as data) using an increased transmission power than the transmission power used in a previous transmission; reducing the data rate in one or more of the sub-channels relative to the data rate used in a previous transmission; transmitting data with reduced inter-symbol interference (for example, with blank intervals inserted before and/or after the data); adjusting a period of the one or more timing signals; adjusting a skew or delay of the one or more timing signals; transmitting data at a single clock edge (as opposed to dual-data-rate transmission); transmitting data with at least a portion of the data including ECC or EDC; transmitting data using a different encoding or modulation code than the encoding used in a previous transmission; transmitting data after a pre-determined idle time; transmitting data to a different receiver circuit; and/or changing the number of sub-channels. In some embodiments one or more of these adjustments are performed: continuously; as needed (for example, based on one or more of the performance metrics); and/or after a pre-determined time interval.

In some embodiments, the remedial action (and more generally adjustments to one or more of the sub-channels) is based on control information that is exchanged between the memory controller 410 and one or more of the memory devices 412. This control information may be exchanged using in-band communication (e.g., via the frequency bands used to communicate the signals corresponding to the data) and/or out-of-band communication (e.g., using the separate link).

In some embodiments, the remedial action and/or adjustments involve an auto-negotiation technique. During this auto-negotiation technique, a receiver circuit in one of the components (such as the memory controller 410) may provide feedback to a transmit circuit in another component (such as memory device 412-1) on the efficacy of any changes to the signals on a given sub-channel. Based on this feedback, the transmit circuit may further modify these signals, e.g., may perform the remedial action.

Devices and circuits described herein may be implemented using computer-aided design tools available in the art, and embodied by computer-readable files containing software descriptions of such circuits. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level RTL languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Additionally, physical files may be implemented on machine-readable media such as: 4 mm magnetic tape, 8 mm magnetic tape, 3½ inch floppy media, CDs, DVDs, and so on.

Figure 5:
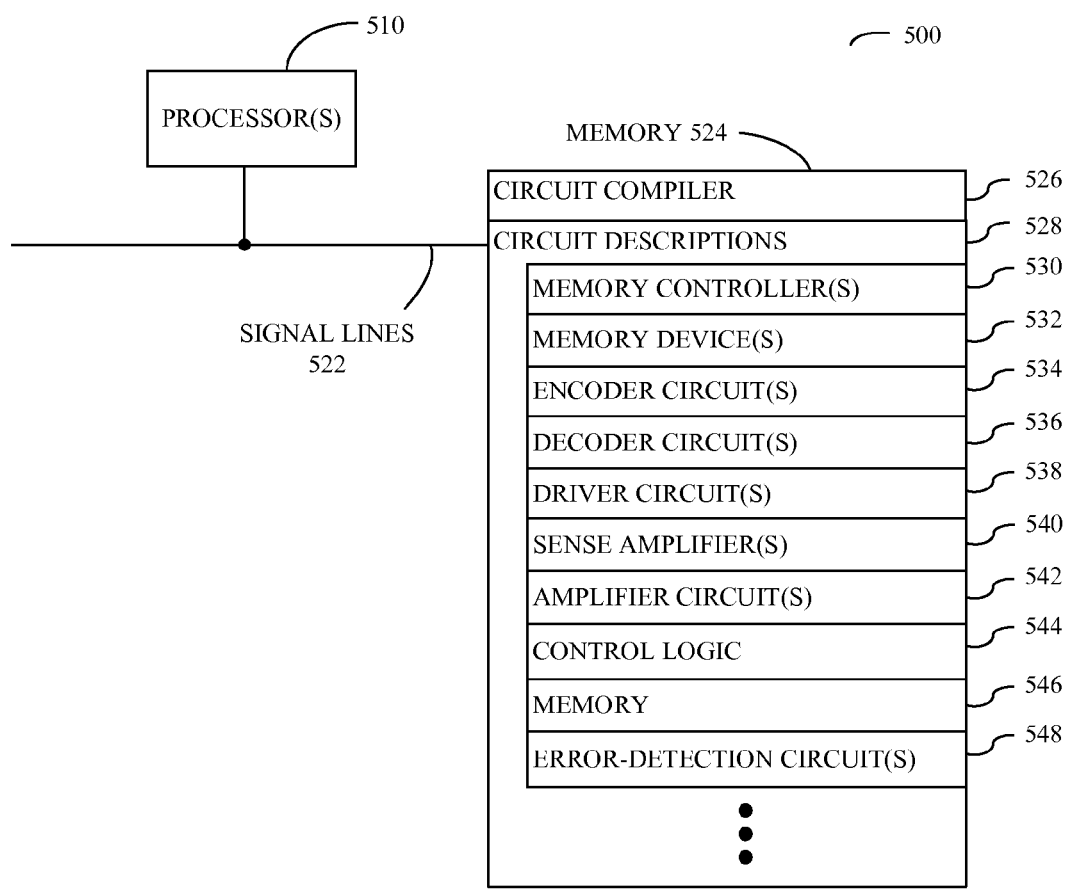
FIG. 5 is a block diagram illustrating an embodiment of a system.

FIG. 5 presents a block diagram illustrating an embodiment of a system 500 that stores such computer-readable files. This system may include at least one data processor or central processing unit (CPU) 510, memory 524 and one or more signal lines or communication busses 522 for coupling these components to one another. Memory 524 may include high-speed random access memory and/or non-volatile memory, such as: ROM, RAM, EPROM, EEPROM, flash, one or more smart cards, one or more magnetic disc storage devices, and/or one or more optical storage devices.

Memory 524 may store a circuit compiler 526 and circuit descriptions 528. Circuit descriptions 528 may include descriptions of the circuits, or a subset of the circuits discussed above with respect to FIG. 1. In particular, circuit descriptions 528 may include circuit descriptions of: one or more memory controllers 530, one or more memory devices 532, one or more encoders 534, one or more decoders 536, one or more driver circuits 538, one or more sense amplifiers 540, one or more amplifier circuits 542, control logic 544 (or a set of instructions), memory or a buffer 546, and/or one or more error-detection circuits 548.

In some embodiments, system 500 includes fewer or additional components. Moreover, two or more components can be combined into a single component, and/or a position of one or more components may be changed.

While the preceding embodiments have used inter-chip or inter-device communication as an illustrative example, in other embodiments the communication technique may be used in conjunction with intra-chip or intra-device communication. For example, such communication may occur between components in a given integrated circuit.

In some embodiments, a first circuit includes an encoder circuit that encodes a set of N symbols as a given codeword in a code space, where the given codeword includes a set of M symbols. M drivers in the first circuit are coupled to the encoder circuit and are coupled to M links in a channel, where a given driver outputs a given symbol in the set of M symbols onto a given link. Moreover, an error-detection circuit in the first circuit, which is coupled to the encoder circuit, generates and stores error-detection information associated with the set of M symbols, where the error-detection information facilitates subsequent probabilistic determination of a type of error during communication of the set of M symbols to another circuit. Additionally, a receiver circuit in the first circuit receives feedback information from the other circuit. This feedback information includes error information about detection of another type of error in the set of M symbols based on characteristics of the code space. Furthermore, control logic in the first circuit performs remedial action based on the feedback information.

In some embodiments, the feedback information includes additional error-detection information associated with the set of M symbols which is generated in the other circuit. Moreover, the probabilistic determination of the type of error may be based on a comparison of the error-detection information and the additional error-detection information.

In some embodiments, the remedial action may be based on the probabilistic determination of the type of error. Moreover, the type of error may affect a number of symbols which is less than a pre-determined number of symbols in the set of M symbols. Additionally, the other type of error may affect a number of symbols which is more than or equal to the pre-determined number of symbols in the set of M symbols.

In some embodiments, the remedial action includes resending the set of M symbols to the other circuit.

In some embodiments, the encoding includes dynamic bus inversion. For example, the encoding may include selective inversion of the set of M symbols if there is more than a pre-determined number of a first value in the set of M symbols. Moreover, the set of M symbols may include binary values, including the first value and a second value.

In some embodiments, the error information indicates that set of M symbols received at the other circuit corresponds to an invalid codeword in the code space.

In some embodiments, the channel couples the first circuit to the other circuit. Moreover, the first circuit may be included on an integrated circuit, and the other circuit may be included on another integrated circuit or the integrated circuit.

Another embodiment provides a first system that includes the first circuit.

Another embodiment provides a computer-readable medium that includes data that specifies the first circuit.

Another embodiment provides a first method for communicating data, which may be performed by a device (such as a memory device and/or a memory controller). During operation, the device encodes a set of N symbols as a given codeword in a code space in a circuit, where the given codeword includes a set of M symbols. Next, the device transmits the set of M symbols to another circuit via a channel that includes M links, where a given symbol is transmitted on a given link. Then, the device generates and stores error-detection information associated with the set of M symbols, where the error-detection information facilitates subsequent probabilistic determination of a type of error during communication of the set of M symbols to the other circuit.

Moreover, the device receives feedback information from the other circuit, where the feedback information includes error information about detection of another type of error in the set of M symbols based on characteristics of the code space. Additionally, the device performs remedial action based on the feedback information.

Another embodiment provides a second circuit that includes M input nodes that receive a set of M symbols, where the M input nodes are coupled to M links in a channel, and where a given input node receives a given symbol on a given link. Moreover, a decoder circuit decodes a given codeword in a code space associated with the set of M symbols to a set of N symbols, and provides error information about detection of a type of error in the set of M symbols based on characteristics of the code space. Additionally, an error-detection circuit, coupled to the decoder circuit, generates error-detection information associated with the set of M symbols, where the error-detection information facilitates subsequent probabilistic determination in another circuit of another type of error during communication of the set of M symbols to the circuit. Furthermore, a transmit circuit provides feedback information to the other circuit, thereby facilitating remedial action by the other circuit.

In some embodiments, the feedback information includes the error-detection information associated with the set of M symbols. Moreover, the probabilistic determination of the other type error may be based on a comparison of the error-detection information and additional error-detection information, which was previously determined and stored in the other circuit.

In some embodiments, the remedial action may be based on the probabilistic determination of the other type of error. Moreover, the other type of error may affect a number of symbols which is less than a pre-determined number of symbols in the set of M symbols. Additionally, the type of error may affect a number of symbols which is more than or equal to the pre-determined number of symbols in the set of M symbols, and the feedback information may include the error information about detection of the type of error in the set of M symbols.

In some embodiments, the remedial action includes resending the set of M symbols to the circuit.

In some embodiments, the decoding includes dynamic bus inversion. For example, the decoding may include selective inversion of the set of M symbols if there is more than a pre-determined number of a first value in the set of M symbols. Moreover, the set of M symbols may include binary values, including the first value and a second value.

In some embodiments, the error information indicates that set of M symbols corresponds to an invalid codeword in the code space.

In some embodiments, the channel couples the second circuit to the other circuit. Moreover, the second circuit may be included on an integrated circuit, and the other circuit may be included on another integrated circuit or the integrated circuit.

Another embodiment provides a second system that includes the second circuit.

Another embodiment provides a computer-readable medium that includes data that specifies the second circuit.

Another embodiment provides a second method for communicating data, which may be performed by a device (such as a memory device and/or a memory controller). During operation, the device receives a set of M symbols in a circuit from another circuit, where the set of M symbols are received via a channel that includes M links, and where a given symbol is transmitted on a given link. Next, the device decodes a given codeword in a code space associated with the set of M symbols to a set of N symbols, and provides error information about detection of a type of error in the set of M symbols based on characteristics of the code space.

Additionally, the device generates error-detection information associated with the set of M symbols, where the error-detection information facilitates subsequent probabilistic determination in the other circuit of another type of error during communication of the set of M symbols to the circuit. Furthermore, the device transmits feedback information to the other circuit, thereby facilitating remedial action by the other circuit.

The preceding description has been presented to enable any person skilled in the art to make and use the disclosed embodiments, and was provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Moreover, the foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method of operation in a memory device, the method comprising:
receiving write data from a memory controller that is encoded via a dynamic-bus-inversion (DBI) code that inverts one or more symbols in the write data in accordance with a constraint:
detecting an error in the write data through a violation of the constraint; and
communicating error information associated with the detected error:, to the memory controller.

2. The method according to claim 1, further comprising:
storing the error information in a memory prior to communicating the error information to the memory controller.

3. The method according to claim 1, wherein the DBI encoding constraints includes inverting a set of M symbols if there are more than a predetermined number of symbols in the M symbols that have a first value.

4. The method according to claim 1, wherein the DBI-encoded write data is further encoded via a cyclic-redundancy-check (CRC) code.

5. A memory device comprising:
receiver circuitry to receive write data from a memory controller that is encoded via a dynamic-bus-inversion (DBI) code that inverts one or more symbols in the write data in accordance with a constraint;
a DBI decoder coupled to the receiver circuitry to decode the write data consistent with a DBI coding constraint;
error detection circuitry operative to indicate an error in the write data if the DBI coding constraint is violated; and
transmitter circuitry to communicate error information associated with the error in the write data to the memory controller.

6. The memory device according to claim 5, further comprising:
a memory to store the error information.

7. The memory device according to claim 5, wherein the DBI-encoded write data is further encoded via a cyclic-redundancy-check (CRC) code, the memory device further comprising:
a CRC decoder to decode the CRC-encoded write data.

8. The memory device according to claim 5 embodied as a dynamic random access memory (DRAM).

9. A method of operation in a memory controller, the method comprising:
encoding write data via a dynamic-bus-inversion (DBI) code that inverts one or more symbols in the write data in accordance with a constraint;
transmitting the write data to a memory device;
receiving error information from the memory device, the error information generated in response to a violation of the constraint applied by the DBI encoding.

10. The method according to claim 9, wherein the DBI coding constraint involves inverting a set of M symbols if the there are more than a predetermined number of symbols in the M symbols that have a first value.

11. The method according to claim 9, further comprising:
encoding the DBI-encoded write data via a cyclic-redundancy-check code.

12. The method according to claim 11 wherein the error information is associated with either the DBI encoding or the CRC encoding.

13. The method according to claim 9, further comprising:
re-transmitting at least a portion of the write data associated with the error information.

14. A memory controller comprising:
a dynamic-bus-inversion (DBI) encoder to encode write data via a DBI code that inverts one or more symbols in the write data in accordance with a constraint;
transmit circuitry to transmit the DBI-encoded write data to a memory device;
receive circuitry to receive error information from the memory device, the error information generated in response to a violation of the constraint associated with the DBI encoding.

15. The memory controller according to claim 14, and further comprising:
a cyclic-redundancy-check (CRC) encoder to encode the DBI-encoded write data via a CRC code.

16. The memory controller according to claim 15, wherein the DBI encoding constraint involves inverting a set of M symbols if there are more than a predetermined number of symbols in the M symbols that have a first value.

17. The memory controller according to claim 14 embodied as a dynamic random access memory controller.

18. The memory controller according to claim 14, wherein the transmit circuitry is responsive to receipt of the error information to re-transmit at least a portion of the write data associated with the error information.

19. A method of operation in a memory controller, the method comprising:
- receiving read data from a memory device that is encoded via a dynamic-bus-inversion (DBI) code that inverts one or more symbols in the write data in accordance with a constraint;
- detecting errors in the read data in response to a violation of the constraint associated with the DBI encoding; and
- communicating error information associated with the detected errors to the memory device.

20. The method according to claim 19, further comprising: storing the error information in a memory prior to communicating the error information to the memory device.

21. The method according to claim 19, wherein the DBI encoding constraint involves inverting a set of M symbols if there are more than a predetermined number of symbols in the M symbols that have a first value.

22. The method according to claim 19, wherein the DBI-encoded read data is further encoded via a cyclic-redundancy-check (CRC) code.

* * * * *